United States Patent [19]

Poor

[11] Patent Number: 4,874,410
[45] Date of Patent: Oct. 17, 1989

[54] VACUUM PRODUCING APPARATUS

[75] Inventor: James C. Poor, E. Granby, Conn.

[73] Assignee: The Spencer Turbine Company, Windsor, Conn.

[21] Appl. No.: 325,790

[22] Filed: Mar. 20, 1989

[51] Int. Cl.4 .............................................. B01D 46/00
[52] U.S. Cl. .................................... 55/276; 55/341.2; 55/335; 55/465; 55/467; 417/312
[58] Field of Search ............. 55/276, 334, 335, 341.1, 55/341.2, 436, 465, 467; 417/312

[56] References Cited

U.S. PATENT DOCUMENTS

| | | | |
|---|---|---|---|
| 3,424,501 | 1/1969 | Young | 55/341.1 |
| 4,284,507 | 8/1981 | Beane | 55/341.2 |
| 4,764,190 | 8/1988 | Israelson et al. | 55/465 |

Primary Examiner—Bernard Nozick
Attorney, Agent, or Firm—McCormick, Paulding & Huber

[57] ABSTRACT

A vacuum producing apparatus includes a bag separator having a cylindrical housing containing a plurality of filter bags supported by and extending between upper and lower bag heads. A radially disposed inlet conduit projects through the wall of the separator below the lower gab head to direct incoming air toward an expendable target plate releasably retained in depending relation to the lower bag head. A multi-stage blower connected to the separator evacuates air from it and has a mounting base which comprises a silencer and defines an exhaust passageway communicating with the interior of the blower casing for discharging air from and below the casing.

16 Claims, 2 Drawing Sheets

VACUUM PRODUCING APPARATUS

BACKGROUND OF THE INVENTION

This invention relates in general to vacuum producing apparatus and deals more particularly with improvements in heavy duty apparatus for use in industrial and commercial vacuum systems.

Apparatus of the type with which the present invention is concerned generally includes a cyclonic bag separator having a cylindrical housing including an air inlet for connection to an associated vacuum system and an air outlet connected to a multi-stage blower or the like for evacuating air from the separator. The air inlet is usually connected to the separator housing to direct air into the housing along a path generally tangent to the cylindrical interior surface of the housing. Air enters the separator at relatively high velocity causing sand, grit or other abrasive material entrained in the entering air to impinge upon and abrade the inner surface of the housing wall. In a vacuum system used to move air likely to contain relatively large amounts of sand, grit or other abrasive materials, such as may be encountered in a vacuum cleaning system for a car wash or the like, damage to the housing may result, requiring repair or housing replacement. To compensate for this wear condition, it may be necessary to construct the separator housing from relatively heavy gauge material or, alternatively, to reinforce it in the regions of greatest wear, which adds substantially to the cost of manufacturing the apparatus.

In an installation of the type with which the present invention is concerned, the blower operates in an axially horizontal position, air being discharged from the blower housing through a vertically upwardly extending discharge conduit which may be conveniently fitted with a silencer where quiet operation is required. However, such a vertical exhaust arrangement necessitates a weather cap or other means to prevent rain or snow from entering the blower housing, which adds further to the cost of manufacture.

It is the general aim of the present invention to provide an improved vacuum producing apparatus of the aforedescribed type which substantially eliminates separator housing wear when the apparatus is operated in a hostile environment and which may be produced at a reduced cost without sacrifice of operational efficiency.

SUMMARY OF THE INVENTION

The present invention is concerned with improvements in vacuum producing apparatus which includes a bag separator having a generally cylindrical axially vertically extending housing, a lower bag head disposed within the housing and cooperating with the walls thereof to define upper and lower chambers within the housing, an upper bag head disposed within the upper chamber above the lower bag head, a plurality of filter bags disposed within the upper chamber and supported by and extending between the upper and lower bag heads and opening into the lower chamber, air inlet means for providing an airflow path into the lower chamber, air outlet means for providing an airflow path from the upper chamber, and exhausting means connected to said air outlet means for evacuating air from the upper chamber.

In accordance with the present invention an expendable target plate is releasably supported in depending relation to the lower bag head in the path of airflow into the lower chamber from the air inlet means.

Further, and in accordance with the invention, the exhausting means comprises a blower having a mounting base which cooperates with the blower housing to define a silencer and which discharges air along a path generally parallel to the blower axis and below the blower housing.

DETAILED DESCRIPTION OF PREFERRED EMBODIMENT

Figure 1:
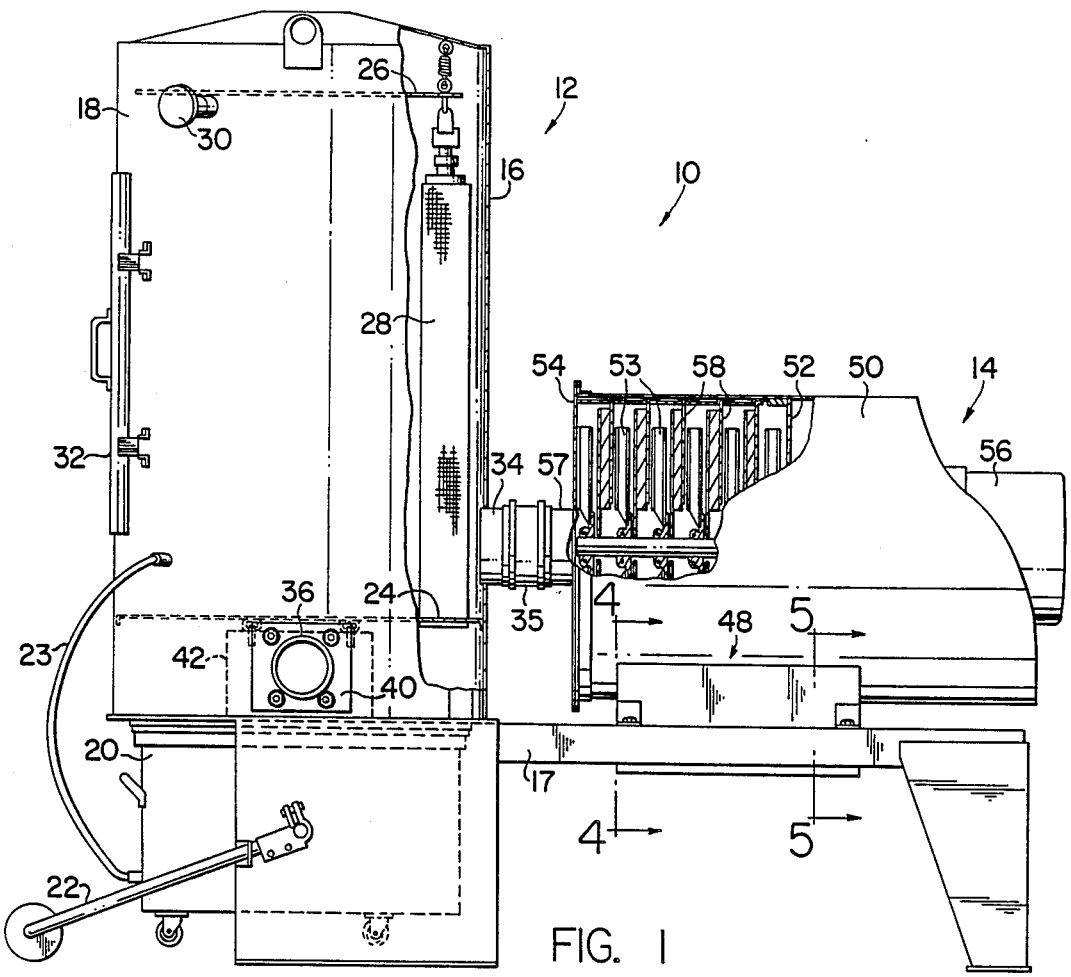
FIG. 1 is a side elevational view of a vacuum producing apparatus embodying the present invention.

In the drawings and in the description which follows, the invention is illustrated and described with reference to a modified SPENCER INDUSTRAVAC heavy duty vacuum producing apparatus, manufactured and marketed by The Spencer Turbine Company, Windsor, Conn., 06095, assignee of the present invention.

The illustrated apparatus 10 is suitable for either indoor or outdoor operation and is particularly adapted for connection to an industrial or commercial vacuum system (not shown) for moving air containing relatively large quantities of abrasive material, such as sand or grit, which may, for example, be encountered in a vacuum cleaning system for a car wash or the like.

As shown, the apparatus essentially comprises a bag separator, designated generally by the numeral 12, for removing entrained waste material from an air stream which enters the separator, and a multi-stage blower, indicated generally at 14, connected to the separator for evacuating air from it, as will be hereinafter discussed.

Considering now the separator 12 in further detail, it has a generally cylindrical axially upwardly extending bag housing indicated generally at 16 mounted on a stationary support base 17. The housing includes an upper part 18 and a removable lower part or waste container 20. A pivotally movable bail 22 at the front end of the apparatus operates a cam mechanism (not shown) for raising and lowering the container 20. In FIG. 1 the container is shown locked in its raised position in sealing engagement with the upper part 18 by the bail 22 and its associated cam mechanism. An air pressure equalizer line 23 connected by quick-connect couplings between the upper and lower parts of the housing is provided to prevent a plastic bag liner from being drawn out of the container by vacuum produced by the apparatus.

A generally radially disposed lower bag head 24 mounted in fixed position within the housing 16 forms a partition which separates a bag chamber in the upper portion of the housing from the remainder of the housing therebelow. A radially disposed upper bag head 26 is supported within the bag chamber near the upper end of the housing for limited movement by a plurality of springs connected between the upper bag head and the upper wall of the housing. A plurality of vertically axially elongated filter bags 28,28 are connected to and extend between the upper and lower bag heads, in a manner well known in the separator art. The open lower ends of the filter bags 28,28 communicate with associated openings in the lower bag head 24 and open into the lower portion of the separator housing 16. A manually operable bag shaker 30 having a handle exposed outside of the housing is attached to the upper bag head 26. Access to the bag chamber is provided by a relatively large access door 32 on the front of the housing 16 to facilitate filter bag inspection and replacement, as may be necessary. An air outlet conduit 34 mounted in fixed position on the separator housing 16 in communication with the bag chamber is connected to the blower 14 through a flexible sleeve connector 35.

In accordance with the present invention, at least one tubular inlet conduit is attached to the housing to provide a radially inwardly directed airflow path into the lower portion of the separator 12 below the lower bag head 24 for air received from an associated vacuum system. However, the illustrated apparatus 10 includes two such tubular air inlet conduits indicated at 36 and 38 and located at diametrically opposite sides of the separator housing 16. The illustrated conduit 36 comprises a main inlet conduit, extends through the housing wall, and projects inwardly for some distance toward the axial center of the separator housing 16. A mounting flange 40 carried by the conduit 36 is secured to the housing by bolts or other suitable fasteners and preferably gasketed to prevent air leakage around the conduit. The inner end of the conduit 36 is bias cut along its length in a plane inclined relative to the axis of the conduit, as shown, so that the inner end of the conduit opens downwardly along substantially its entire length or from its free inner end to a position near the inner surface of the housing wall to provide a downwardly facing discharge opening. The conduit 36 projects outwardly for some distance beyond the flange 40 to facilitate connection with an associated piping system which comprises a part of an associated vacuum system.

The capped tubular conduit 38 is somewhat smaller than the main inlet conduit 36 and is adapted for connection to a vacuum hose for intermittent use and which comprises part of the vacuum cleaning system. A flange 41 having fastener apertures identical to those of the flange 40 secures the conduit 38 to the housing 16. Thus, the conduits 36 and 38 are adapted for interchangeable mounting at opposite sides of the housing 16.

Figure 3:
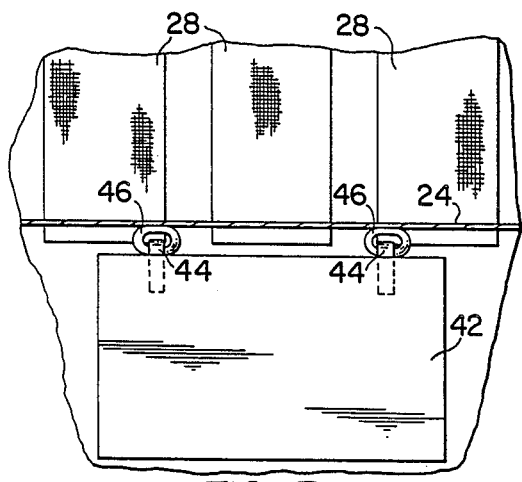
FIG. 3 is a somewhat enlarged fragmentary sectional view taken along the line 3—3 of FIG. 2.
Figure 4:
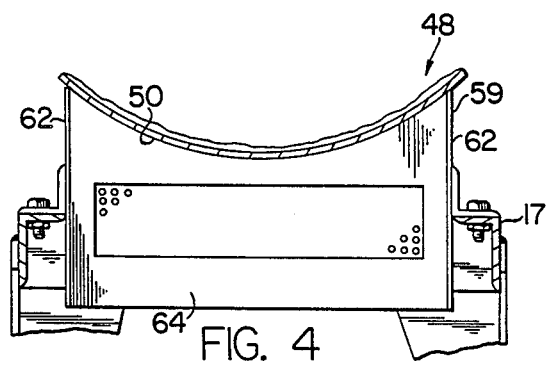
FIG. 4 is a somewhat enlarged fragmentary sectional view taken along the line 4—4 of FIG. 1.
Figure 2:
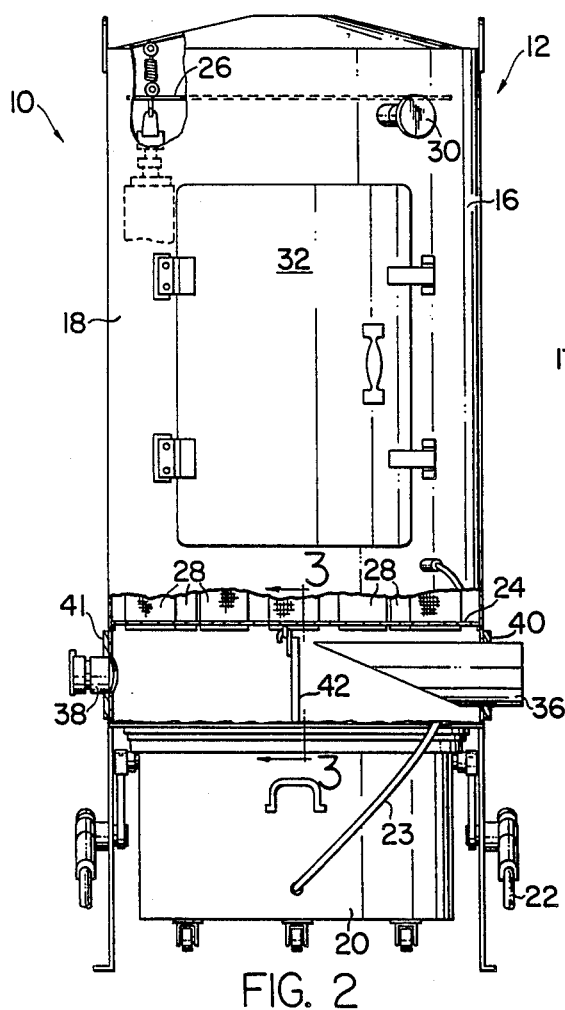
FIG. 2 is a front elevational view of the apparatus shown in FIG. 1.
Figure 5:
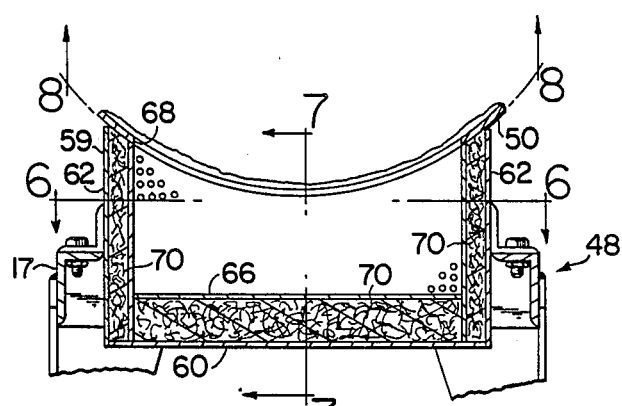
FIG. 5 is a somewhat enlarged fragmentary sectional view taken along the line 5—5 of FIG. 1.

An expendable target plate 42, shown in FIGS. 1-3, is supported in depending relation from the lower surface of the lower bag head 24 and is preferably disposed in normal relation to the axes of the inlet conduits 36 and 38 and in the path of the airflow into the separator 12 from the latter conduits. Preferably, and as best shown in FIG. 3, the expendable target plate 42 carries a pair of hooks 44,44 which are engaged within associated eyes 46,46 welded or otherwise suitably fastened to the lower surface of the lower bag head 24. The hooks and eyes which cooperate to releasably retain the expendable target plate 42 and allow it to be removed and replaced, as necessary, when the waste container 20 is removed.

Further improvements which comprise the present invention are embodied in the illustrated multi-stage blower 14 which, as shown, comprises a modified SPENCER turboblower also manufactured and marketed by the assignee of the present invention. The blower 14 is of overhung type construction and includes a mounting base, indicated generally at 48, attached to the stationary support base 17 which supports the blower for axially horizontal operation. The blower has a generally cylindrical coaxial casing 50 carried by the mounting base 48 and which includes a division head 52 and an end head 54 which cooperate with the casing 50 to define the blower chamber. A plurality of impellers 53,53 are mounted directly on the extending shaft of a motor 56 supported by a motor base mounted on the casing 50 near the division head 52. Air evacuated from the separator 12 enters the blower 14 through an intake conduit 57 connected to the separator outlet conduit 34 by the flexible sleeve connector 35 and opening through the end head 54 into the blower chamber. A plurality of deflectors 58,58 mounted in fixed position within the blower chamber channel air from one impeller to the next and toward the motor end of the casing 50 in a manner well known in the blower art.

Further, and in accordance with the present invention, the blower mounting base 48 cooperates with the blower casing 50 to define both an air exhaust outlet from the blower casing and a silencer or muffler for controlling the operational noise level of the blower 14.

Figure 7:
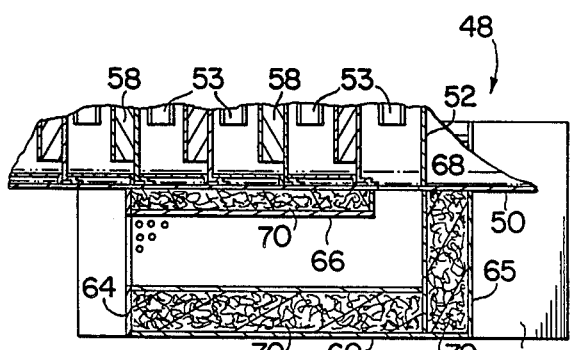
FIG. 7 is a fragmentary sectional view taken along the line 7—7 of FIG. 5.
Figure 6:
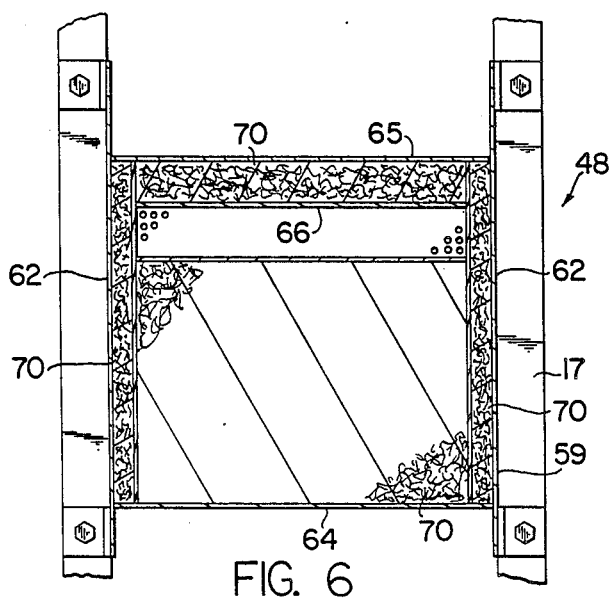
FIG. 6 is a fragmentary sectional view taken along the line 6—6 of FIG. 5.
Figure 8:
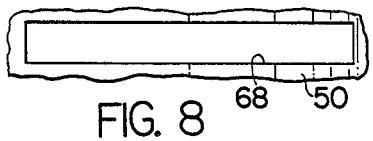
FIG. 8 is a fragmentary sectional view taken generally along the line 8—8 of FIG. 5.

Referring now particularly to FIGS. 4–8, the blower mounting base 48 is formed by an outer shell 59 and an inner shell 66 welded or otherwise secured in sealed condition to the lower surface of the motor casing 50. The outer shell 59 is preferably fabricated from sheet metal and has a bottom wall 60, a pair of opposing side walls 62,62, a front wall 64 and a rear wall 65. A lower portion of the blower casing 50 cooperates with the front, rear and side walls to form a closure for the upper end of the outer shell. The inner shell 66 is preferably fabricated from perforated sheet metal, and defines a generally L-shaped exhaust passageway of generally rectangular cross-section within the outer shell 59. The exhaust passageway has a vertically extending portion which communicates with an air outlet slot 68 opening through the lower portion of the casing into the blower chamber and a horizontally extending portion opening through the front wall 64, as best shown in FIG. 7. A quantity of sound insulating material indicated at 70 occupies the space between the inner and outer shells which comprise the mounting base 48. In accordance with the presently preferred construction, fiberglass insulating material is utilized for this purpose.

I claim:

1. In a vacuum producing apparatus including a bag separator having a generally cylindrical axially vertically extending housing, a lower bag head disposed within the housing and cooperating with the walls of the housing to define upper and lower chambers within the housing, an upper bag head disposed within the upper chamber above the lower bag head, a plurality of separator bags disposed within the upper chamber and supported by and extending between the upper and lower bag heads, the separator bags opening into the lower chamber, air inlet means for defining an airflow path into the lower chamber, air outlet means for defining an airflow path from said upper chamber, and exhausting means connected to said air outlet means for evacuating air from the upper chamber, the improvement comprising said air inlet means defining a radially inwardly directed airflow path, an expendable target plate, and means releasably supporting said target plate in depending relation to said lower bag head in the path of airflow into said lower chamber from said air inlet means.

2. In the vacuum producing apparatus as set forth in claim 1 the further improvement wherein said means for releasably securing said target plate comprises a ring attached to one of said members comprising said lower bag head member and said target plate member and a hook connected to the other of said members and engaged with said ring.

3. In a vacuum producing apparatus as set forth in claim 1 wherein the lower portion of said housing is defined by a removable container the further improvement wherein said target plate is accessible for removal and replacement when said container is removed from said housing.

4. In a vacuum producing apparatus as set forth in claim 1 the further improvement wherein said air inlet means comprises at least one conduit extending through the wall of said housing and having an inner and portion extending in the direction of said target plate.

5. In a vacuum producing apparatus as set forth in claim 4 the further improvement wherein said inner end portion opens downwardly along a substantial portion of its length.

6. In a vacuum producing apparatus as set forth in claim 4 the further improvement wherein said target plate depends centrally from said lower bag head.

7. In a vacuum producing apparatus as set forth in claim 4 the further improvement wherein said target plate comprises a substantially flat plate supported with its surface in normal relation to the axis of said one conduit.

8. In a vacuum producing apparatus as set forth in claim 1 wherein said apparatus includes a support base, said housing is mounted on said support base, and said exhausting means comprises a multi-stage blower having a casing defining a blower chamber and a mounting base attached to a lower portion of said casing and supporting said blower on said support base, the further improvement wherein said mounting base cooperates with a lower portion of said casing to define an exhaust passageway communicating with said blower chamber for discharging air from said blower chamber below said blower casing and a silencer for controlling the operational noise level of said blower.

9. In a vacuum producing apparatus as set forth in claim 8 the further improvement wherein said mounting base includes an inner shell and an outer shell and said inner shell defines said exhaust passageway.

10. In a vacuum producing apparatus as set forth in claim 9 the further improvement wherein said inner shall is fabricated from perforated sheet material and said mounting base includes a quantity of sound insulating material disposed in the spaces between said inner shell and said outer shell.

11. In a vacuum producing apparatus as set forth in claim 8 the further improvement wherein said exhaust passageway comprises a generally L-shaped passageway having a vertically disposed portion communicating with a slot opening through the lower portion of said casing and a horizontally disposed portion communicating with said vertically disposed portion and opening outwardly through said outer shell.

12. Vacuum producing apparatus having a bag separator including a housing, an inlet conduit communicating with the interior of said housing for defining an airflow path into said housing, an expendable target plate releasably supported within said housing and disposed in the path of airflow into said housing from said inlet means, outlet means communicating with the interior of said housing, a blower connected to said outlet means for exhausting air from said housing having a casing defining a blower chamber, and a mounting base for supporting said blower and cooperating with said casing to define an exhaust passageway communicating with said blower chamber to exhaust air from said blower chamber below said casing and silencing means for controlling the operational noise level of said blower.

13. Vacuum producing apparatus as set forth in claim 12 wherein said mounting base includes inner and outer shells cooperating with an associated lower portion of said casing to define said exhaust passageway and said silencing means.

14. Vacuum producing apparatus as set forth in claim 13 wherein said outer shell has bottom, side, front and rear walls and said inner shell defines a generally L-shaped passageway having a downwardly extending portion communicating with a slot opening through the lower portion of said casing into said blower chamber and a horizontally disposed portion communicating with said downwardly opening portion and opening through the front wall of said outer shell.

15. Vacuum producing apparatus as set forth in claim 14 wherein said inner shell has perforated walls and said support base includes a quantity of sound insulating material disposed in the spaces between said inner shell and said outer shell.

16. In a vacuum producing apparatus including a bag separator having generally cylindrical axially vertically extending housing, a lower bag head disposed within the housing and cooperating with the walls of the housing to define upper and lower chambers within the housing, an upper bag head disposed within the upper chamber above the lower bag head, a plurality of separator bags disposed within the upper chamber and supported by and extending between the upper and lower bag heads, the separator bags opening into the lower chamber, air inlet means for defining an airflow path into the lower chamber, air outlet means for defining an airflow path from said upper chamber, and exhausting means connected to said air outlet means for evacuating air from the upper chamber, the improvement comprising said air inlet means including at least one tubular conduit mounted on the wall of said housing and extending in a radial direction through said wall and toward the axial center of said housing, said one conduit having an inner end portion opening downwardly along a substantial portion of its length, a substantially flat expendable target plate, and means releasably supporting said target plate in depending relation to the lower bag head at a central portion of said lower bag head and with a surface of said target plate disposed in normal relation to the axis of one said conduit.

* * * * *